United States Patent
Allwine

[11] Patent Number: 5,580,134
[45] Date of Patent: Dec. 3, 1996

[54] MULTI-FUNCTION DUMP VEHICLE

[76] Inventor: Park T. Allwine, 2469 E. 22nd St., Tulsa, Okla. 74114

[21] Appl. No.: 506,838

[22] Filed: Jul. 25, 1995

[51] Int. Cl.⁶ .................................................. B60P 1/34
[52] U.S. Cl. .............................. 298/11; 414/471; 414/495
[58] Field of Search ................... 298/1 A, 1 B, 298/11, 22 J; 414/385, 386, 471, 482, 495, 563

[56] References Cited

U.S. PATENT DOCUMENTS

| | | | |
|---|---|---|---|
| 2,963,185 | 12/1960 | Jones et al. | 298/11 |
| 3,514,000 | 5/1970 | Kolling et al. | 414/495 X |
| 3,619,007 | 11/1971 | Phillips | 298/11 |
| 3,874,537 | 4/1975 | Kou . | |
| 3,902,616 | 9/1975 | Santic et al. | 298/11 X |
| 4,019,781 | 4/1977 | Ray | 298/22 J |
| 4,480,871 | 11/1984 | Fox | 298/22 J |
| 4,951,999 | 8/1990 | Rudolph et al. | 298/11 |
| 5,000,645 | 3/1991 | Polojarvi | 414/471 |

FOREIGN PATENT DOCUMENTS 2397303  3/1979  France ................................ 414/471

*Primary Examiner*—Karen B. Merritt
*Assistant Examiner*—Janice L. Krizek
*Attorney, Agent, or Firm*—Head, Johnson & Kachigian

[57] ABSTRACT

There is provided a multi-function dumping vehicle having standard chassis and bed. The bed is positioned on the chassis and is pivotably mounted to the chassis as is conventional. The bed is undergirded by longitudinal body rails. A deck is pivotably mounted to the bed by a cross body hinge. Accessory rails are installed to run parallel to the body rails and are affixed at one end to the forwardly placed, transverse cross body hinge. A front hoist having a first end pivotably mounted to the chassis and a second end pivotably mounted to the bed is used to raise the bed to a standard dumping configuration. A rear hoist having a first end pivotably mounted to the body rails and a second end pivotably mounted to the accessory rails is used to raise the deck to a reverse dumping configuration. When the front and rear hoists are used in combination, a high lift platform is obtained. The invention is also adaptable for use with flat bed trucks and high lift vehicles to provide a reverse dumping capability. A kit for modifying standard dump vehicles, flat bed trucks and high lift vehicles is also disclosed.

20 Claims, 8 Drawing Sheets

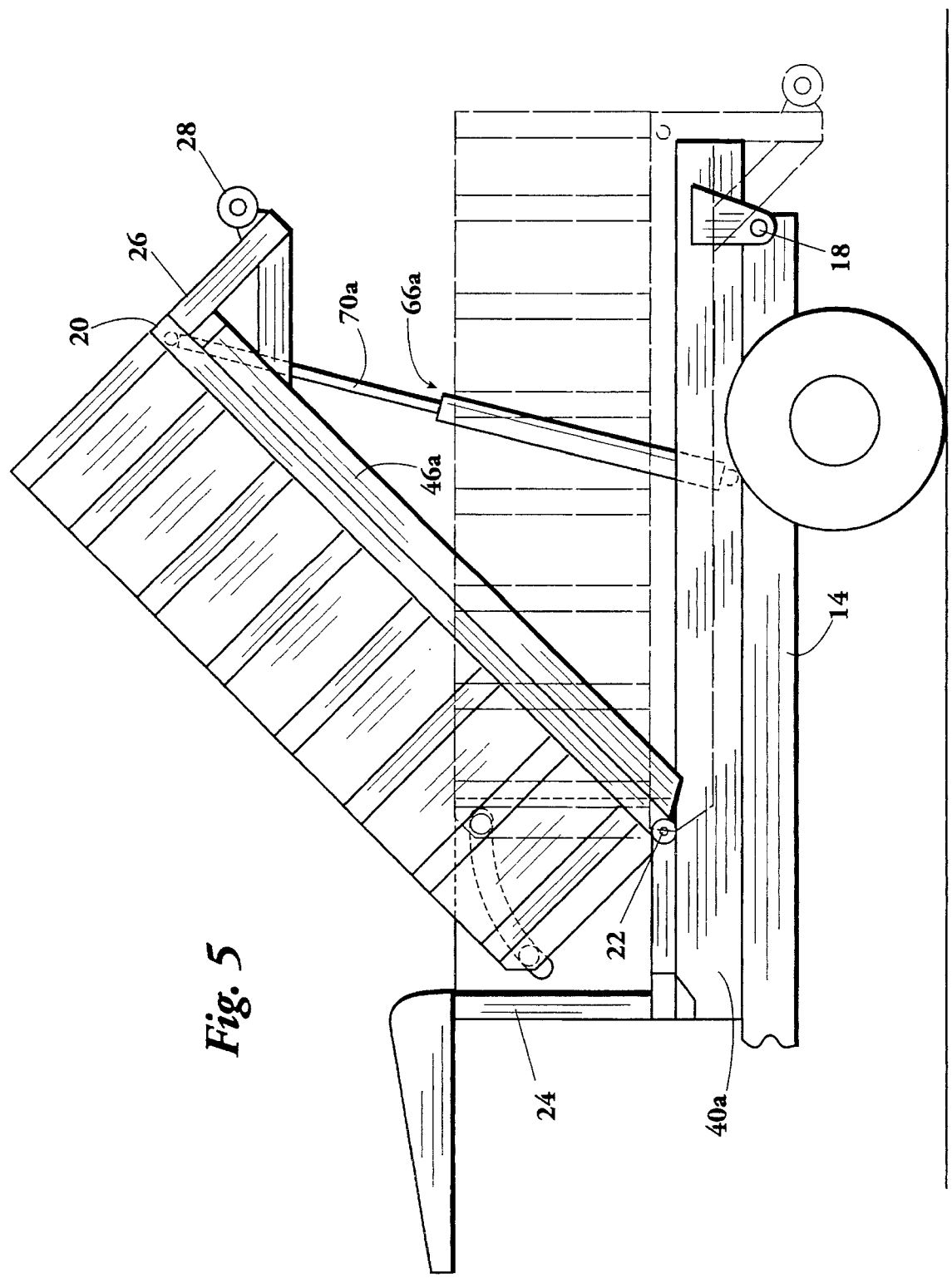

MULTI-FUNCTION DUMP VEHICLE

BACKGROUND OF THE INVENTION

1. Technical Field

The present invention relates generally to dumping vehicles, and more specifically to multi-function dump vehicles having a reverse dumping capability.

2. Background

Conventional dump trucks, flat bed trucks and high lift vehicles include a bed mounted on a chassis, the bed being undergirded by longitudinal body rails. In standard dump trucks, the bed is pivotally mounted (rearwardly) to the chassis. A hoist mechanism is used to raise the forward portion of the bed, expelling its contents out the rear of the bed. Flat bed trucks are those that have a bed for hauling a load, but the bed does not pivot for dumping. Conventional dump trucks and flat bed trucks are useful in transporting materials from one location to another.

High lift vehicles can transport loads, and can be configured to dump in a conventional manner, but they are also used to provide an elevated platform. A traditional high lift vehicle raises the entire bed above the chassis. This type of vehicle may better facilitate the loading and unloading of cargo.

"Roll off" trucks are used to transport containers from site to site. A roll off truck empties a container by elevating a forward portion of the container, dumping its contents.

To obtain the advantages of above-described types of vehicles, one generally must incur the expense of acquiring and maintaining several machines. Moreover, when it is necessary for a trailer to be used in conjunction with a conventional dumping vehicle, flat bed truck, or high lift vehicle, either the trailer must be off-loaded by hand, as the vehicle is not capable of raising the tongue of the trailer to empty the trailer's contents, or the trailer must be equipped with hydraulics mounted on the trailer chassis to assist in the loading/unloading process.

It is thus an object of this invention to provide multi-function utility vehicles having, among other features, a reverse dumping capability to assist in the loading and unloading of a trailer.

It is a further object of this invention to provide a kit for modifying a standard dumping vehicle, flat bed truck or high lift vehicle such that it can alternately perform in a reverse dump capacity.

SUMMARY OF THE INVENTION

The foregoing and other objects and advantages are attained by the multi-function vehicles described hereunder. Each vehicle includes a bed mounted on a conventional chassis, the bed being undergirded by longitudinal body rails.

One embodiment encompasses a multi-function dumping vehicle capable of transporting and dumping a cargo in a conventional manner, operating as a high lift platform, and attaining a reverse dumping configuration to aid in the loading/unloading of a trailer. In this embodiment, a deck is pivotally mounted to the bed at a generally forward location by a transverse cross body hinge. Accessory rails are installed to run parallel to the body rails and are affixed at one end to the cross body hinge and along their length to the underside of the deck. A front hoist means having a first end pivotally mounted to the chassis and a second end pivotally mounted to the bed is used to raise the bed to a standard dumping configuration. A rear hoist means having a first end pivotally mounted to the body rails and a second end pivotally mounted to the accessory rails is used to raise the deck to a reverse dumping configuration. When the hoist means are used in tandem a high lift platform is obtained.

In accordance with another aspect of the invention, two crossbars and a hydraulic ram are used as the rear hoist means. The first crossbar is affixed to and extends between the body rails, while the second crossbar is affixed to and extends between the accessory rails. At least one hydraulic ram is used to move the accessory rails in relation to the body rails. The hydraulic ram is affixed between the first crossbar and the second crossbar such that, when employed, the ram works to elevate a rearward portion of the deck in relation to the bed.

In another embodiment, a flat bed truck is adapted for reverse dumping. Like the other conventional vehicles, the truck includes a chassis and a bed positioned on the chassis, the bed being undergirded by longitudinal body rails. A deck is provided, and a cross body hinge is installed to pivotally mount the deck to the bed. Accessory rails are affixed to the cross body hinge and deck underside, the accessory rails running underneath the deck parallel to the body rails. A hoist means having a first end pivotally mounted to the body rails and a second end pivotally mounted to the accessory rails raises the deck to a reverse dumping configuration.

In still another embodiment, a high lift vehicle having a reverse dumping capability is provided. The high lift vehicle also includes a chassis and a bed positioned on the chassis, the bed being undergirded by longitudinal body rails. A standard scissor lift is used to lift the entire bed above the chassis. A cross body hinge is installed to pivotally mount a deck to the bed. Accessory rails are affixed to the cross body hinge and deck underside and run underneath the deck parallel to the body rails. In this embodiment, a hoist means having a first end pivotally mounted to the scissor lift and a second end pivotally mounted to the accessory rails raises the deck to a reverse dumping configuration.

As a variation in each embodiment, and if tolerances allow, a single accessory rail may be used to undergird the deck. In this instance the overall construction of the vehicle is the same, except the relevant hoist means end is pivotally affixed directly to the accessory rail, rather than to a crossbar between two accessory rails.

In accordance with a further aspect of the invention, a coupling means is rearwardly connected below the deck for mating with a tongue of a trailer. Preferably the coupling means comprises a pintle hook. The present invention may also include a trailer having a Lunette eye for coupling with the pintle hook.

In accordance with still another aspect of the invention, a kit is provided for modifying a standard dumping vehicle, flat bed truck or high lift vehicle such that it may alternately perform in a reverse dumping capacity. All conventional dump trucks, flat bed trucks and high lift vehicles that include a bed mounted on a chassis, the bed being undergirded by longitudinal body rails, are subject to modification in accordance with the invention.

The kit includes a cross body hinge for pivotally mounting a deck to a conventional bed at a generally forward location, the bed being undergirded by longitudinal body rails. Accessory rails are provided with the kit for mounting parallel to the body rails underneath the deck, and a hoist means is included for attachment to the accessory rails such that the hoist means may raise the deck to a reverse dumping configuration.

Thus, the present invention furnishes operators with a single vehicle capable for use in several different applications, saving acquisition and maintenance costs.

Still other objects and advantages of the present invention will become readily apparent to those skilled in this art from the following detailed description, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature, and not as restrictive.

BRIEF DESCRIPTION OF THE DRAWINGS

FIG. 5 is a partial side elevation view showing the invention in a reverse dumping configuration.

DETAILED DESCRIPTION OF THE PREFERRED EMBODIMENT

Figure 1:
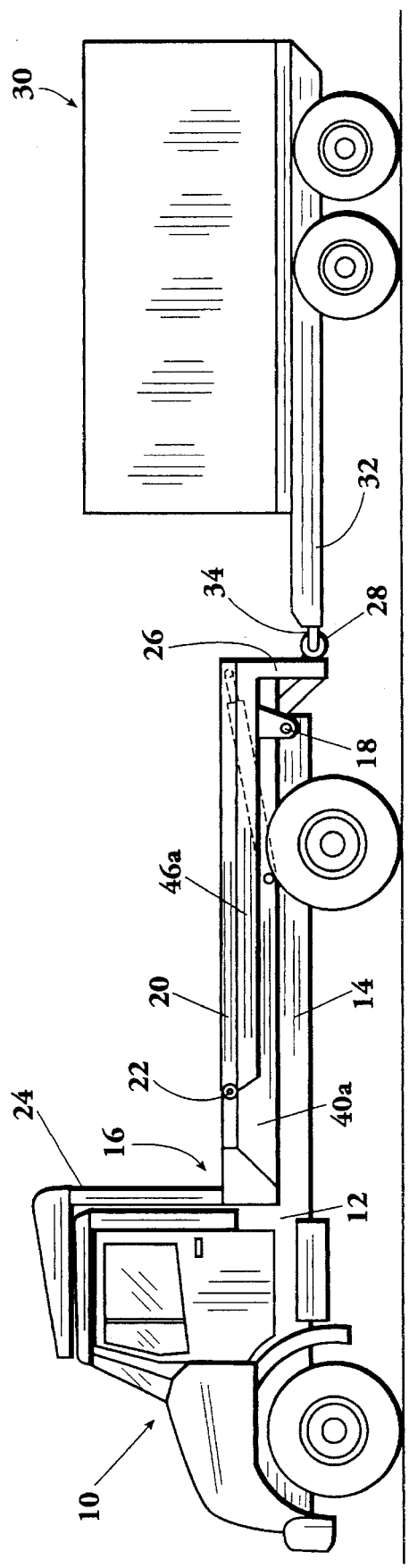
FIG. 1 is a side elevation view of one embodiment of the invention connected to a trailer.

Referring now to FIG. 1, there is shown a conventional dumping vehicle insofar as there is a cab 10 mounted on a chassis 12. Cab 10 is positioned above a motor or a power source (not shown) in a conventional manner. The chassis 12 includes side frame rail 14, which runs longitudinally from the front of the vehicle to its rear. For purposes of this specification, the term "chassis" should be understood to include a conventional cab, motor, frame and wheel assembly.

Positioned upon the chassis 12 above side frame rail 14 and behind the cab 10 is a dump bed, generally indicated by the reference numeral 16. The bed 16 is pivotably mounted to the chassis 12 at a generally rearward location by a pivot joint 18.

The bed 16 has a deck 20 that is pivotally mounted thereto at a generally forward location by a cross body hinge 22. As shown, the bed 16 may also include a vertical bulkhead 24 positioned behind and extending over the cab 10. Shown with phantom lines in FIG. 1 is a portion of a rear hoist means described hereinbelow.

Beneath a rear portion of deck 20 is a downwardly directed vertical portion 26. Affixed at the bottom of the vertical portion 26 is a coupling means 28. The coupling means 28 shown in FIG. 1 is a pintle hook. The pintle hook 28 is adapted to connect the vehicle to the tongue of a trailer.

Also shown in FIG. 1 is a conventional trailer 30 having a trailer tongue 32, the forwardmost end of which is provided with a Lunette eye 34. The pintle hook 28 engages the Lunette eye 34 to provide for the smooth raising of the trailer tongue 32 as described in further detail below.

Figure 2:
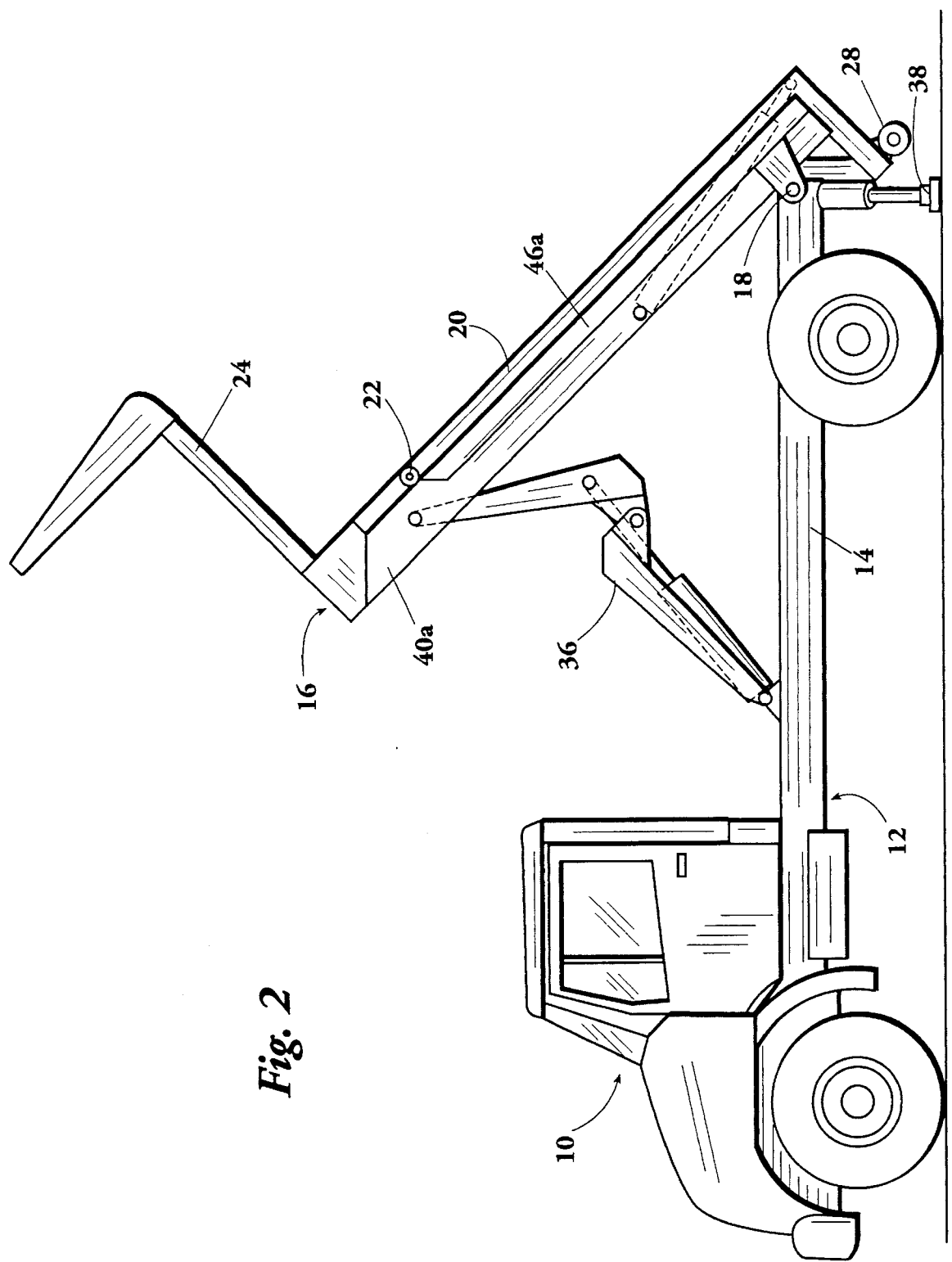
FIG. 2 is a side elevation view of the invention shown in a standard dumping configuration.

Turning now to FIG. 2, the invention is shown in a standard dumping configuration. Particularly evident in this view is a front hoist means 36 having a first end pivotably mounted to the chassis 12 at a generally forward location and a second end pivotably mounted to the underside of the bed 16 at a generally forward location, such that the front hoist means 36 may raise the bed 16 in relation to the chassis 12. In this standard dumping configuration, the bed 16 pivots at pivot joint 18.

The front hoist means 36 shown in FIG. 2 comprises the well-known Omaha Standard Hoist. It is mounted in a standard manner to chassis 12 and bed 16. It should be understood, however, that one or more hydraulic rams can be used in a variety of ways to function as the front hoist means 36.

Also shown in FIG. 2 is an outrigger 38 secured rearwardly to the chassis 12 for stabilizing the vehicle. Generally, there should be provided an outrigger 38 on each side of the chassis 12.

Figure 3:
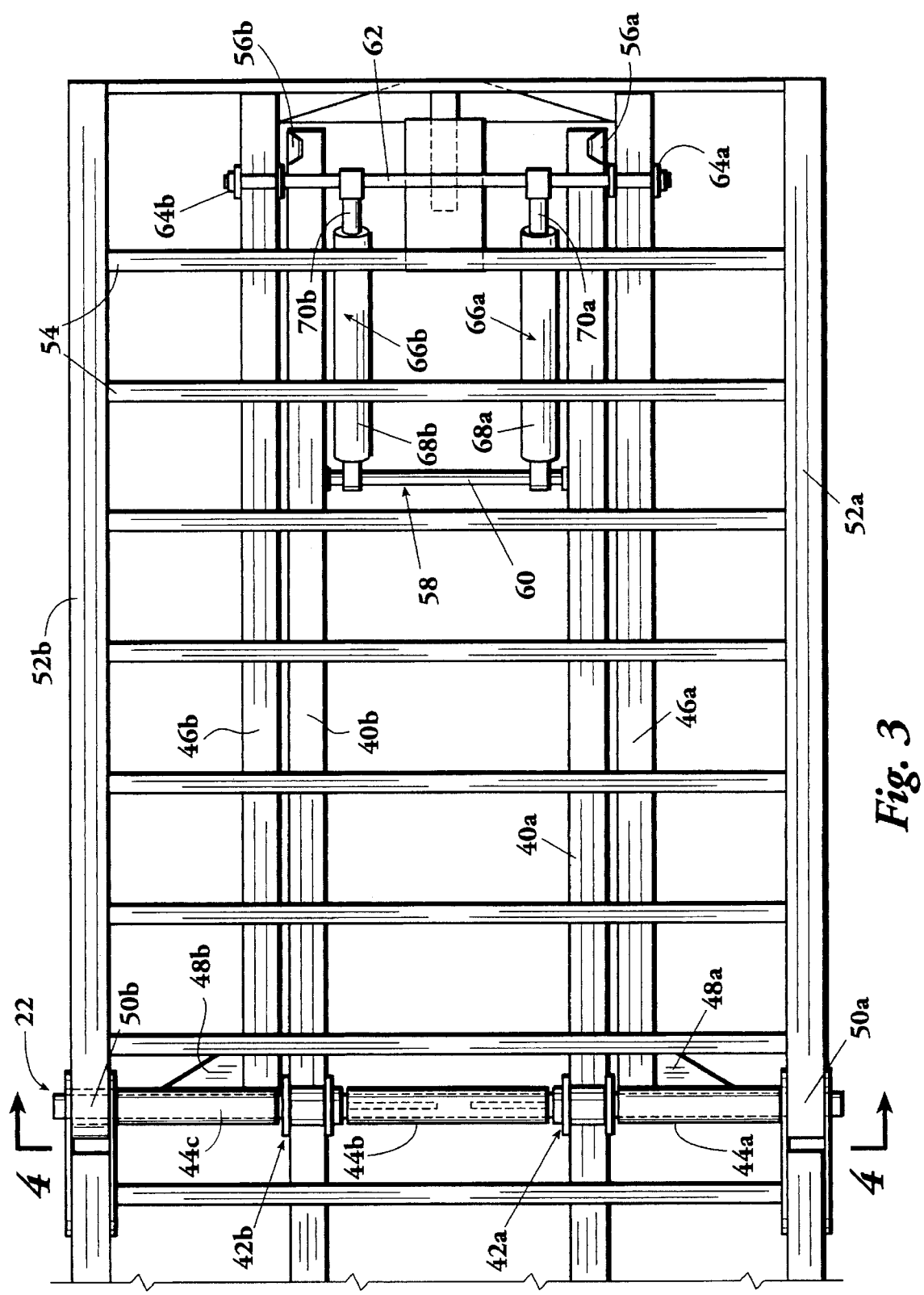
FIG. 3 is a top plan view showing the structural components of the invention used to elevate the deck of a bed into a reverse dumping configuration.

Referring now to FIGS. 1, 2 and 3 and focusing on the undergirding composing, in part, the bed 16 and deck 20, the bed 16 is undergirded by two longitudinal body rails 40a–b. These body rails 40a–b are generally located above the frame rails of chassis 12 and are a standard part of a conventional dump vehicle, flat bed truck or high lift vehicle. The deck 20 component of the bed 16 is shown to be pivotally hinged by a cross body hinge 22. The cross body hinge 22 comprises a shaft 43 (shown in FIG. 4) for coupling the deck 20 to the bed 16, the shaft running perpendicular to the longitudinal body rails 40a–b and being affixed to each such body rail 40a–b by a hinge boss 42a–b. The cross body hinge 22 also includes three rotatable sleeves 44a–c.

Two accessory rails 46a–b run parallel to the longitudinal body rails 40a–b on the outside thereof. The accessory rails 46a–b are affixed at their forwardmost ends to the rotatable sleeves 44a and 44c of the cross body hinge 22. Angled gussetts 48a–b are used to join the forwardmost ends of the accessory rails 46a–b to the rotatable sleeves 44a and 44c.

Figure 4:
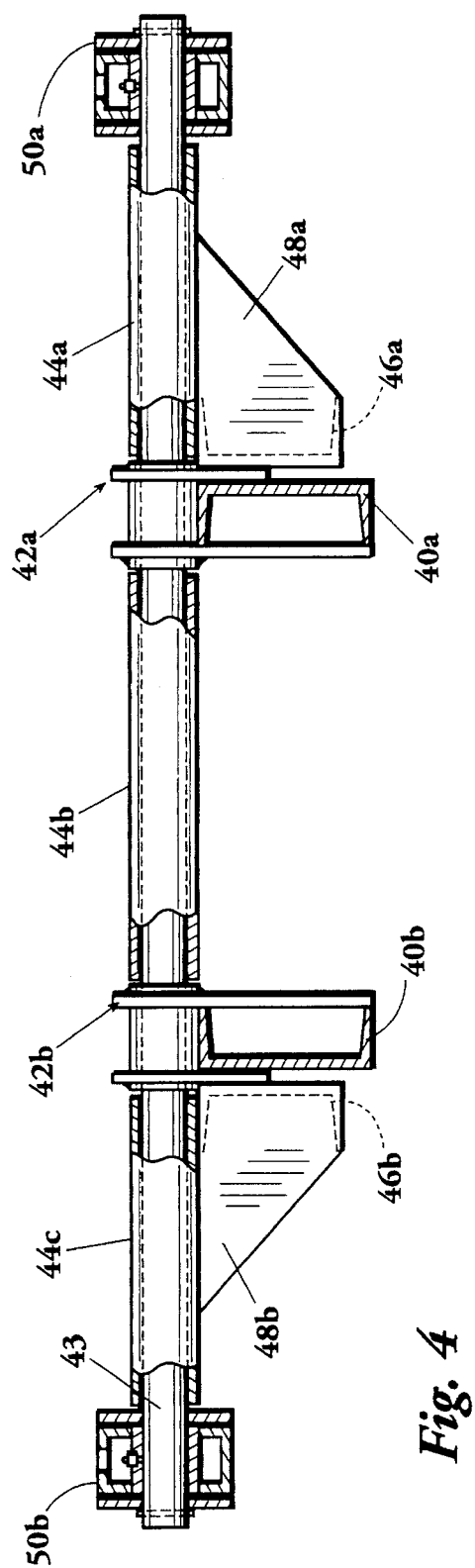
FIG. 4 is a cross-section showing the cross body hinge component of the invention.

Switching for a moment to FIG. 4, the cross body hinge 22 is shown in more detail in a partial cut-away view. In this view the shaft 43 of the cross body hinge 22 is shown. The shaft 43 is affixed to the longitudinal body rails 40a–b by hinge boss 42a–b. The angled gussetts 48a–b are welded to the outer rotatable sleeves 44a and 44c.

Also shown in FIGS. 3 and 4 are the deck pivot joints 50a–b. The deck pivot joints 50a–b allow the outer deck frame members 52a–b (and deck 20 as a whole) to pivot up and away from the bed 16. The deck 20 is further supported by a plurality of crossmembers 54 which run perpendicular to the longitudinal body rails 40a–b. The accessory rails 46a–b are affixed to the cross-members 54 in a conventional manner, such as by welding.

The longitudinal body rails 40a–b are provided on their rearward ends with angled, inwardly-directed flanges 56a–b for aiding in the seating of the deck 20 upon the bed 16.

Further shown in FIG. 3 is a rear hoist means, generally indicated by the reference numeral 58. The rear hoist means 58 has a first end pivotably mounted to the body rails 40a–b at a generally rearward location and a second end pivotally mounted to the accessory rails 46a–b at a generally rearward location, such that the rear hoist means 58 may raise the deck 20 to a reverse dumping configuration.

The rear hoist means 58 may include a first crossbar 60 affixed to and extending between the body rails 40a–b, such as by welding. A second crossbar 62 is affixed to and extends between the accessory rails 46a–b at a location to the rear of the first crossbar 60. The second crossbar 62 is shown mounted to the accessory rails 46a–b by a rear hinge 64a–b. Two hydraulic rams 66a–b are used to supply hoist. The hydraulic rams 66a–b each have a fluid cylinder 68a–b and a movable piston arm 70a–b. Preferably, the fluid cylinders 68a–b are pivotably connected to the first crossbar 60, while the piston arms 70a–b are pivotably connected to the second cross bar 62, such that, when extended, the piston arms 70a–b work to elevate a rearward portion of the deck 20 in relation to the bed 16. Other arrangements of hydraulic rams would suffice to perform the necessary function, such as reversing the connection of piston arms and cylinders, but the above arrangement is preferred. Similarly, the positions of the crossbars (60 and 62) could be reversed.

If tolerances allow, a single accessory rail (46) may be used to undergird the deck 20. In this instance the overall construction of the vehicle is the same as described above, except the relevant hoist means end (piston arm 70) is pivotably affixed directly to an accessory rail (46), rather than to a crossbar (62) between two accessory rails (46a–b).

Figure 6:
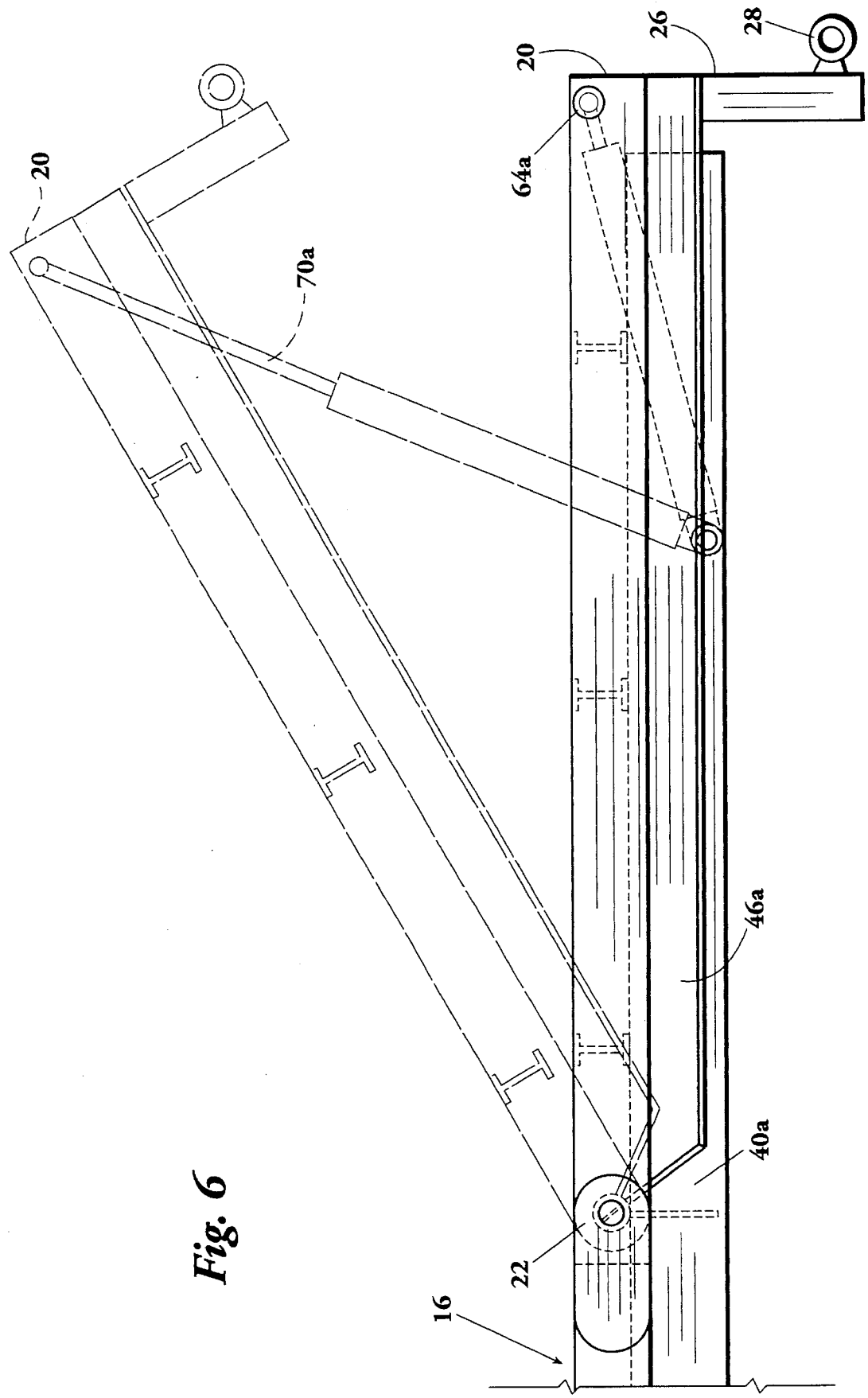
FIG. 6 is a partial side elevation view showing the bed and deck of the invention in a settled position and in a reverse dumping configuration.
Figure 7:
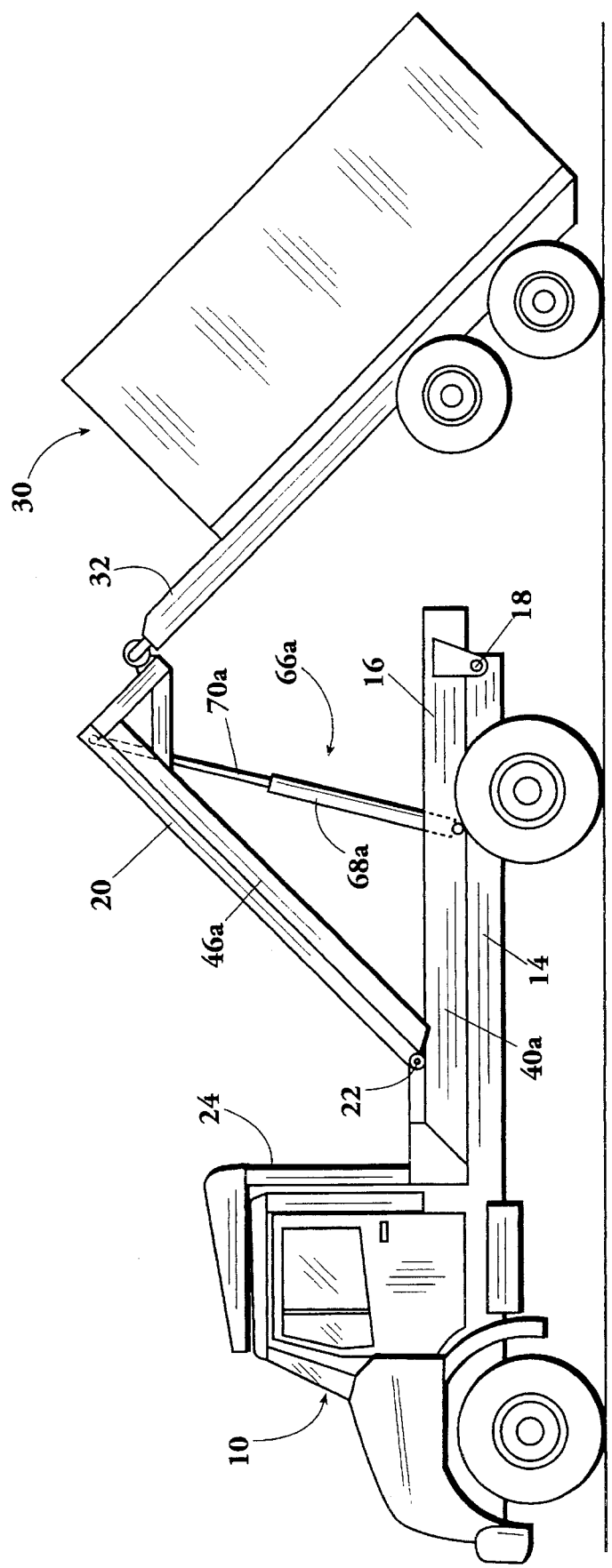
FIG. 7 is a side elevation view, similar to FIG. 1, showing the invention connected to a trailer, the invention being in a reverse dumping configuration.
Figure 8:
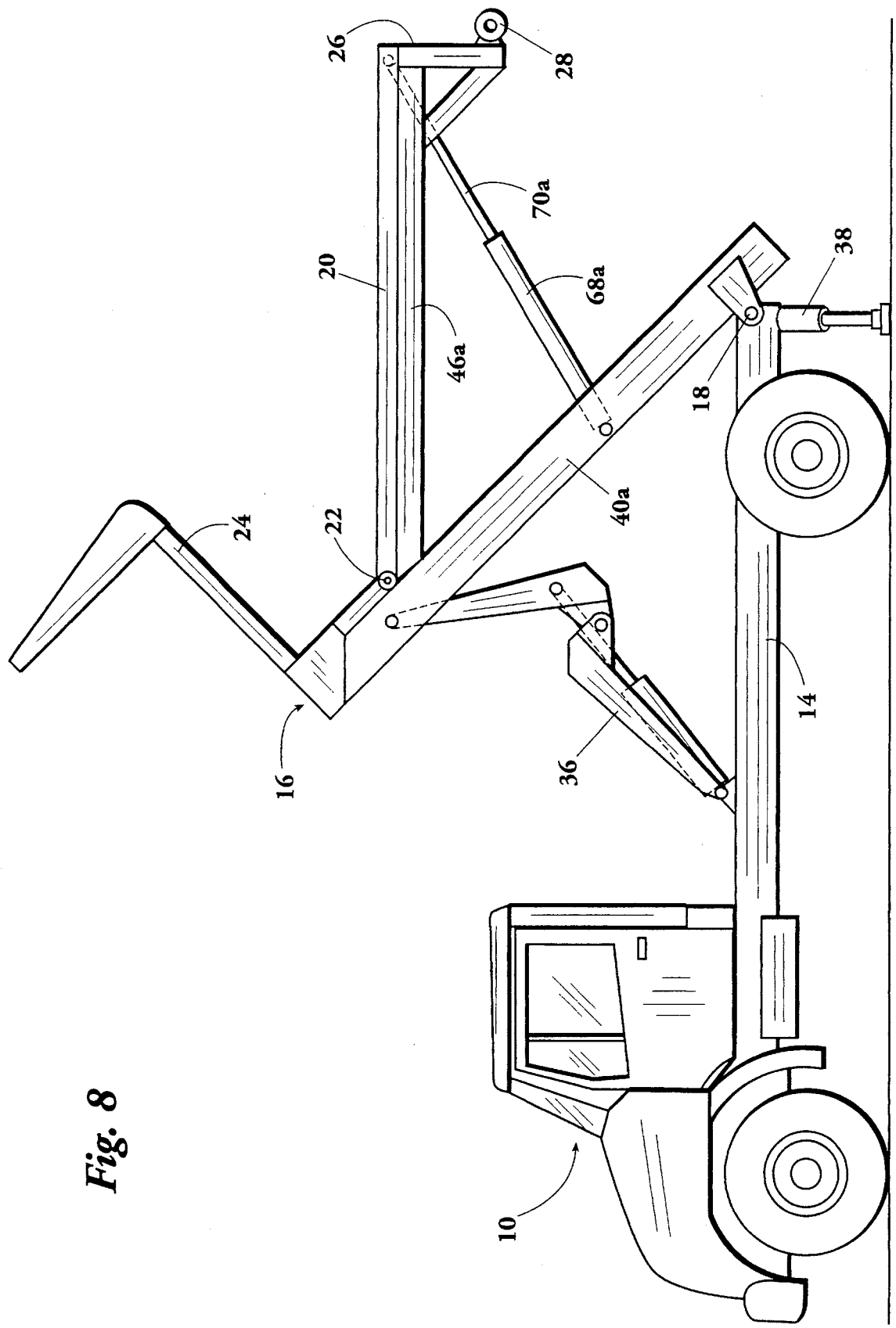
FIG. 8 is a side elevation view showing the invention in its high lift mode.

In operation, this embodiment of the invention may function in either a standard dumping mode, as shown in FIG. 2, in a reverse dumping mode, as shown in FIGS. 5–7, or as a high lift platform as shown in FIG. 8.

FIG. 5 shows this embodiment in a reverse dumping configuration. The piston arms 70a–b of the hydraulic rams 66a–b have been extended such as to raise the rearward portion of the deck 20 in relation to the bed 16. (In this view, the deck 20 is shown to have side boards vertically extending therefrom.) The phantom lines in FIG. 5 show the deck 20 as it would be in a settled position. As is seen, the deck 20 pivots at the cross body hinge 22. Undergirding the deck 20 are accessory rails 46a–b. In the reverse dumping configuration, body rails 40a–b are unmoved. The pintle hook 28 is raised in the reverse dumping configuration which allows for the dumping of a trailer as shown in FIG. 7.

FIG. 6 shows a side view of the bed 16 and deck 20 of the instant embodiment in a settled and reverse dumping configuration. The reverse dumping configuration is shown with phantom lines. Again, it is seen that extending the piston arms 70a–b of the rear hoist hydraulic rams 66a–b works to pivot the deck 20 at cross body hinge 22 by raising the rearward portion of the accessory rails 46a–b from their normal horizontal plane.

FIG. 8 shows a high lift mode that can be achieved when the present invention is incorporated into a standard dumping vehicle. In this mode, the bed 16 is raised to a standard dumping configuration by the front hoist means 36 while the piston arms 70a–b of the hydraulic rams 66a–b are simultaneously extended. In such a configuration, the deck 20 is elevated to provide and maintain a level platform parallel to the ground.

While the above discussion has focused on the invention as used in conjunction with a standard dumping hoist, it is equally advantageous in flat bed trucks and scissor lift vehicles. FIGS. 1 and 3–7 may also represent the invention as used in a flat bed truck embodiment. The only change would be that the bed 16 would not be pivotably mounted on chassis 12 by hinge 18 and there would not be a front hoist mechanism 36. Otherwise, the components of the invention would remain the same.

Figure 9:
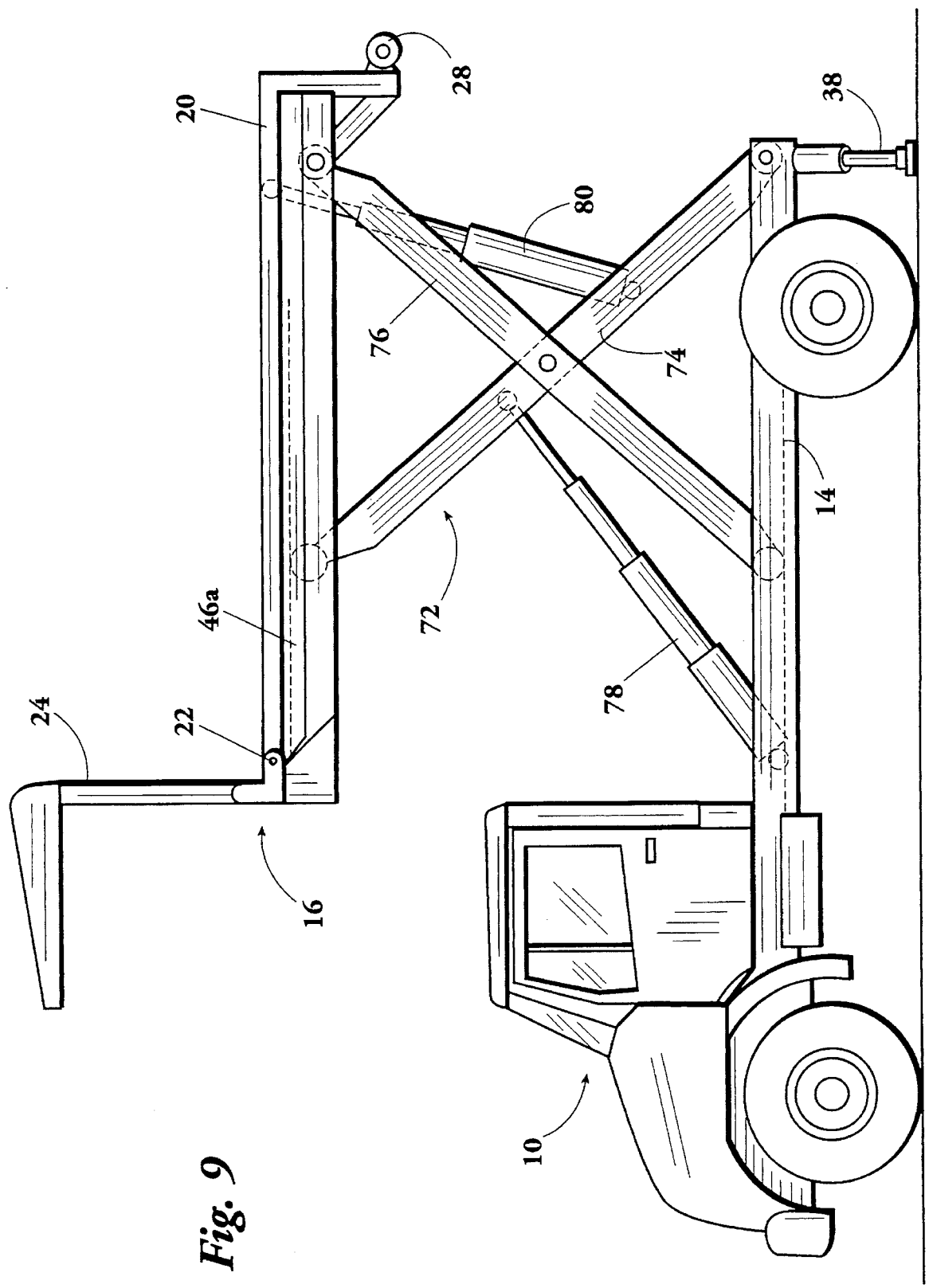
FIG. 9 is a side elevation view showing a scissor lift embodiment in its high lift mode.

FIG. 9 shows a scissor lift embodiment of the invention. In this embodiment, the bed 16 is lifted above the chassis 12 by a standard scissor lift, generally indicated by the reference numeral 72. The scissor lift 72 includes lift arms 74 and 76, and operates in a well-known manner. A hydraulic ram 78 manipulates the lift arms 74 and 76 to raise and lower the bed 16. The bed 16 is constructed similar to that described hereinabove. It is undergirded by longitudinal body rails (40a shown) and is provided with a deck 20 hinged at a forward location by a cross body hinge 22. The bed 16 has a deck 20 that is undergirded by the aforementioned accessory rails (46a shown). A hydraulic ram 80 is connected at one end to the scissor lift 72 and at the other to the accessory rails in the manner hereinabove described. Thus, the scissor lift embodiment allows a standard scissor lift vehicle to operate in a reverse dumping configuration when necessary.

Besides being manufactured in an original vehicle, the present invention is adaptable to assembly in existing vehicles. The component parts of the invention can be provided in a kit for modifying a standard dumping vehicle, flat bed truck or high lift vehicle such that it may alternately perform in a reverse dumping capacity. As each standard vehicle would include a chassis and bed, the bed being undergirded by longitudinal body rails, the kit would include a cross body hinge 22 for pivotably mounting a deck to the bed at a generally forward location. Also included in the kit are accessory rails 46a–b for mounting parallel to the longitudinal body rails underneath the deck. A hoist means 58 for attachment to the accessory rails 46a–b such that the hoist means 58 may raise the deck to a reverse dumping configuration is also included.

The operator of the conventional vehicle must then modify the vehicle such that the deck may pivot at a generally forward location. This may be accomplished by providing the deck with pivot joints, such as shown in FIG. 3 at reference numeral 50a–b. The cross body hinge 22 is then used to mount the deck to the bed at the forward location. From there the accessory rails 46a–b are installed to connect to the cross body hinge 22 and to extend rearwardly, parallel to the longitudinal body rails in the manner and arrangement hereinabove described. The hoist means 58 may then be assembled as further described above.

The kit may also include a pintle hook for attachment to a rear portion of the chassis of the conventional vehicle so as to provide a coupling connection to a trailer having a Lunette eye. Angled gussets 48a–b for securing the accessory rails 46a–b to the cross body hinge 22 may also be provided.

While the invention has been described with a certain degree of particularity, it is manifest that many changes may be made in the method hereinabove described without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A multi-function dumping vehicle, comprising:
   (a) a chassis;
   (b) a bed positioned on said chassis and pivotally mounted to said chassis at a generally rearward location, said bed being comprised of at least two longitudinal body rails and a deck, said deck being pivotally mounted to said body rails by a cross body hinge;

(c) at least two accessory rails, said accessory rails affixed to said cross body hinge and the underside of said deck such that said accessory rails are pivotable along with said deck in relation to said body rails;

(d) a front hoist means having a first end pivotally mounted to said chassis and a second end pivotally mounted to said bed such that said front hoist means may raise said bed to a standard dumping configuration; and (e) a rear hoist means having a first end pivotally mounted to said body rails and a second end pivotally mounted to said accessory rails such that said rear hoist means may raise said deck to a reverse dumping configuration.

2. The multi-function dumping vehicle according to claim 1, further comprising a coupling means connected to a rear portion of said deck for mating with a tongue of a trailer.

3. The multi-function dumping vehicle according to claim 2, wherein said coupling means comprises a pintle hook.

4. The multi-function dumping vehicle according to claim 3, further comprising a trailer having a tongue provided with a Lunette eye for coupling with said pintle hook.

5. The multi-function dumping vehicle according to claim 1, wherein said cross body hinge comprises a shaft for coupling said deck to said bed, said shaft running perpendicular to said body rails and being affixed thereto by a hinge boss, said shaft including a plurality of rotatable sleeves to which are secured said accessory rails.

6. The multi-function dumping vehicle according to claim 5, wherein said accessory rails are secured to said rotatable sleeves by angled gussets.

7. The multi-function dumping vehicle according to claim 1, wherein said cross body hinge is affixed to said body rails by a hinge boss.

8. The multi-function dumping vehicle according to claim 1, wherein said rear hoist means comprises:

(a) a first crossbar affixed to and extending between said body rails;

(b) a second crossbar affixed to and extending between said accessory rails; and (c) at least one hydraulic ram affixed between said first crossbar and said second crossbar such that, when employed, said ram works to elevate a rearward portion of said deck in relation to said bed.

9. The multi-function dumping vehicle according to claim 1, wherein said body rails are provided with angled, inwardly-directed flanges for aiding in the seating of said deck upon said bed.

10. The multi-function dumping vehicle according to claim 1, wherein said deck is further supported by a plurality of cross members running perpendicular to said body rails, said cross members being affixed to said accessory rails.

11. The multi-function dumping vehicle according to claim 1, further comprising at least one outrigger secured to a rear portion of said chassis.

12. A kit having component parts for modifying a dump truck, flat bed truck or high lift vehicle such that the vehicle may alternately perform in a reverse dumping capacity, said vehicle including a chassis and bed, said bed being comprised of at least two longitudinal body rails and a deck, said kit comprising:

(a) a cross body hinge for pivotally mounting said deck to said bed, said deck having an underside;

(b) at least two accessory rails for mounting to said underside of said deck;

(c) a hoist means for lifting said accessory rails such that said deck may be raised to a reverse dumping configuration.

13. The kit according to claim 12, wherein said hoist means comprises:

(a) a first crossbar for affixation between said body rails;

(b) a second crossbar for affixation between said accessory rails; and (c) at least one hydraulic ram affixed between said first crossbar and said second crossbar such that, when employed, said ram works to elevate a rearward portion of said deck in relation to said bed.

14. The kit according to claim 12, further comprising a pintle hook for attachment to a rear portion of said chassis.

15. The kit according to claim 12, wherein said cross body hinge comprises a shaft for coupling said deck to said bed, said shaft being adapted to run perpendicular to said body rails and for affixation thereto by a hinge boss, said shaft including a plurality of rotatable sleeves.

16. The kit according to claim 12, further comprising angled gussets for securing said accessory rails to said rotatable sleeves.

17. A flat bed truck adapted for reverse dumping, comprising:

(a) a chassis;

(b) a bed positioned on said chassis, said bed being comprised of at least two longitudinal body rails and a deck, said deck being pivotally mounted to said body rails by a cross body hinge;

(c) at least two accessory rails, said accessory rails affixed to said cross body hinge and the underside of said deck such that said accessory rails are pivotable along with said deck in relation to said body rails; and (d) a hoist means having a first end pivotally mounted to said body rails and a second end pivotally mounted to said accessory rails such that said hoist means may raise said deck to a reverse dumping configuration.

18. The multi-function dumping vehicle according to claim 17, wherein said hoist means comprises:

(a) a first crossbar affixed to and extending between said body rails;

(b) a second crossbar affixed to and extending between said accessory rails; and (c) at least one hydraulic ram affixed between said first crossbar and said second crossbar such that, when employed, said ram works to elevate a rearward portion of said deck in relation to said bed.

19. A multi-function lifting and dumping vehicle, comprising:

(a) a chassis;

(b) a bed positioned on said chassis, said bed being comprised of at least two longitudinal body rails and a deck having an underside, said deck being pivotally mounted to said body rails by a cross body hinge;

(c) a scissor lift for raising said bed above said chassis;

(d) at least two accessory rails, said accessory rails mounted to said underside of said deck and affixed to said cross body hinge; and (e) a hoist means having a first end pivotally mounted to said scissor lift and a second end pivotally mounted to said accessory rails such that said hoist means may raise said deck to a reverse dumping configuration.

20. A multi-function lifting and dumping vehicle, comprising:

(a) a chassis;
(b) a bed positioned on said chassis, said bed having a deck that is pivotably mounted to at least one longitudinal body rail by a cross body hinge, said cross body hinge having a rotatable collar;
(c) at least one accessory rail mounted to an underside of said deck, said accessory rail being affixed to said rotatable collar; and
(e) a hoist means having a first end pivotably mounted to said chassis and a second end pivotably mounted to said accessory rail such that said hoist means may raise said accessory rail and said deck to a reverse dumping configuration.

* * * * *